United States Patent [19]

Goetz et al.

[11] Patent Number: 4,978,971

[45] Date of Patent: Dec. 18, 1990

[54] METHOD AND APPARATUS FOR REFORMATTING PRINT DATA

[75] Inventors: Howard V. Goetz, Tigard; Richard A. Springer, Tualatin, both of Oreg.

[73] Assignee: Tektronix, Inc., Beaverton, Oreg.

[21] Appl. No.: 419,420

[22] Filed: Nov. 6, 1989

[51] Int. Cl.$^5$ .............................................. B41J 2/01
[52] U.S. Cl. .................................. 346/1.1; 346/33 R; 346/140 R; 364/519; 400/121
[58] Field of Search ................. 346/1.1, 33 R, 140 R, 346/75; 364/519; 400/121

[56] References Cited

U.S. PATENT DOCUMENTS

| | | | |
|---|---|---|---|
| Re. 30,743 | 9/1981 | Shelley et al. ................. | 346/76 PH |
| 4,069,485 | 1/1978 | Martin ................................ | 346/75 |
| 4,084,195 | 4/1978 | Pereira ............................. | 346/75 X |
| 4,112,469 | 9/1978 | Paranjpe et al. . | |
| 4,131,898 | 12/1978 | Gamblin . | |
| 4,232,324 | 11/1980 | Tsao .................................... | 346/75 |
| 4,272,771 | 6/1981 | Furukawa ........................... | 346/75 |
| 4,401,991 | 8/1983 | Martin ................................ | 346/75 |
| 4,593,295 | 6/1986 | Matsufuji et al. ............... | 346/140 R |
| 4,630,076 | 12/1986 | Yoshimura . | |
| 4,737,041 | 4/1988 | Nakayama ......................... | 400/121 |

Primary Examiner—Joseph W. Hartary

Attorney, Agent, or Firm—John D. Winkelman; Edward B. Anderson

[57] ABSTRACT

Print heads are formed with spaced subheads having nozzles such that all of the lines or pixel rows on a print medium such as a sheet of paper are printed by scanning of the print head along the face of the sheet. The head structures include three subheads, each having nozzles for printing one or more adjacent lines with the subheads being spaced the same number of lines apart as the number of lines each prints; and three subheads spaced the equivalent of seven lines apart, each subhead having three nozzles spaced at the equivalent of alternate lines. The heads are advanced between scans by an equivalent number of lines generally equal to the number of nozzles in the head, whereby all print lines are addressed only once. Apparatus for printing includes the use of pointers in registers to keep track of head structure and location on a print medium for calculating print addresses. A partial page memory is used which wraps around to the beginning from the end. A positive printer carriage position encoder uses an index marker located in the middle of a strip of incremental markers. Sensing of the index marker resets an up/down counter with a value that gives a positive value for all count conditions.

37 Claims, 15 Drawing Sheets

METHOD AND APPARATUS FOR REFORMATTING PRINT DATA

FIELD OF THE INVENTION

This invention relates to printing, and in particular, to reformatting image data for printing by a print head having a plurality of print nozzles.

BACKGROUND OF THE INVENTION

This invention is related to the invention disclosed in copending U.S. patent application Ser. No. 07/419,367 of MacLane et al., entitled "Method and Apparatus for Interlaced Printing", assigned to the same assignee as the present application.

The preferred apparatus for and method of practicing the present invention is associated with an ink jet printer wherein a print head scans a print medium, most typically a sheet of paper, by shuttling back and forth across the sheet of paper or by moving continuously along the sheet of paper which is held against a rotating drum. Images are formed by selectively depositing ink deposits or pixels which are located on lines and in columns. The present invention however is equally applicable to any printing process wherein a print head travels along parallel lines relative to a print medium to form a desired final image, whether that image be graphic or textual.

Early scanning print heads contain a single nozzle per color of printing. This nozzle is positioned adjacent a sheet of paper. A print head carriage then moves relative to the paper one line at a time depositing ink pixels at selected pixel locations until the entire image area has been scanned.

The length of time that it takes to make the image on the page depends on the rate of travel of the head relative to the paper and the density of pixels, and therefore lines, desired in the final image. In many commercial applications it is desirable to make the pixels small and dense enough so that the human eye during normal unaided viewing is unable to distinguish between the pixels, thereby making the image appear to be formed of continuous lines. A pixel density of 300 dots per inch (DPI) is common. This means that in order to print one inch of image across a page, 300 lines are required. Thus, for an eleven inch page, 3300 lines are required. If the print head can make ten passes over the page in one second, it would take 5½ minutes to print the page one line at a time. This time can be reduced by printing a U.S. standard 8½×11 inch sheet of paper lengthwise. This would reduce the printing time to 4¼ minutes.

One approach which has been used to reduce the printing time even further is to put multiple printing nozzles on a single printing head so that a plurality of lines are printed simultaneously. An example of a thermal printer-plotter system which has thermal resistor elements which each form pixels and which are provided in an array of adjacent elements is described in U.S. Pat. No. Re. 30,743 (originally U.S. Pat. No. 4,070,680) reissued on Sept. 15, 1981 to Shelley et al. The present invention is also usable in this type of system.

It would appear that the printing time can be reduced to any figure, at least conceptually, by making heads with any desired number of nozzles. This is conceptually possible with thermally driven jets, although the structure becomes very complex. However, it is very difficult to mount piezoelectrically driven jets on the same head so that they print in the same column on adjacent lines. A conduit connected to a reservoir of ink and controls must be connected to each nozzle. When three colors plus black are used, four jets per line are required. As the number of jets is increased, the physical requirements of head construction becomes very limiting.

In order to overcome the limitations of placing nozzles at single-line spacings, the concept of interlaced printing was developed. Representative of conventional interlaced printing are U.S. Pat. Nos. 4,069,485 issued to Martin for "Bidirectional Ink Jet Printer With Moving Record Receiver"; 4,112,469 issued to Paranjpe et al. for "Jet Drop Copying Apparatus"; 4,131,898 issued to Gamblin for "Interlacing Recorder"; 4,272,771 issued to Furukawa for "Ink Jet Printer with Multiple Nozzle Print Head and Interlacing or Dither Means"; 4,593,295 issued to Matsufuji et al.; and 4,630,076 issued to Yoshimura for "Ink-On-Demand Color Ink Jet System Printer".

FIG. 1 shows a simplified design of an exemplary printing head 20 having a plurality (five) of nozzles 22 spaced for printing simultaneously a plurality of spaced lines. Head 20 is positioned adjacent a drum 24 having a print medium, such as a sheet of paper 26, mounted on it. As the drum and sheet rotate, the head is moved at a constant velocity longitudinally along the drum so that all lines are printed. During each full revolution, the head advances the equivalent of 5 line spacings. Thus, on each subsequent revolution, the upper lines between lines printed on the prior revolution are printed in addition to new spaced lines, as shown. This head embodiment is also shown in FIG. 3 for printing by scanning back and forth across a planar print medium.

In these figures, one line spacing between the centers of adjacent lines is the inverse of the dot-per-inch density, or 1/DPI, two line spacings is 2/DPI, etc. In FIG. 2, head 20 is shown in dashed lines at the position at the edge of the sheet after completing a series of lines. The head is also shown in solid lines, in the same position on drum 24, ready to begin the next set of lines. It can be seen by the arrows that two lines of the next set of lines are interlaced with the preceding set of lines. All of the preceding lines are printed. Continued drum rotation results in all of the lines on sheet 26 being printed.

A printing system equivalent to that of FIGS. 1 and 2 is shown in FIG. 3. In this embodiment a head 30 with nozzles 32 prints alternate lines on sheet 34. However, rather than sheet 34 being on a drum and rotated, it is moved both longitudinally and laterally relative to head 30. Normally, the head shuttles back and forth across the face of sheet 34 as the sheet is advanced. After each set of lines is printed, head 30 is shifted down the sheet by an amount shown by arrows 36 and 38 which are equal in length to the width of 5 lines of print. Thus, typically head 30 is stopped at the end of each scan pass, the sheet is shifted, and the head is driven across the sheet in a reverse direction.

It can be seen that the embodiment of FIG. 3 provides in effect the same printing operation or method as that of FIGS. 1 and 2. The letters at the top of the respective head positions represent the passes in alphabetical sequence. Corresponding letters are applied to the beginning of lines printed during each pass.

In such systems, pixel data normally comes to a printer from a controller or data source in strict raster-scan format, in which the upper left-hand pixel is the first in the data stream, the next one to the right arrives next, and so on until the end of the line. The next pixel in the data stream is then the first one in the second line of the image, and the cycle repeats until the end of the image is reached. In the case of print heads which print on more than one line at a time, it is necessary to rearrange this data before it is sent to the print head so that the resultant print correctly duplicates the desired image. The resequencing scheme must be able to generate the data elements for each head nozzle at each head location.

In order for the data reformatting unit to function, as a minimum, all of the data for printing a set of pixels for a given head position must exist in a memory. Conventionally, a memory is selected which is capable of storing the entire set of data elements defining the pixels for an entire image. In this way, there is a one-to-one correspondence between pixel location on the print medium and address locations within the memory. The selection of data elements for each head position then is based simply on a mapping of the printing element positions on the memory. Such memories, however, are very large and have a correspondingly high cost. It is desirable to provide printing in a manner which will require a reduced memory size while maintaining correspondence between the memory locations and head printing elements for each head position during printing.

U.S. Pat. No. 4,069,485 issued to Martin shows an alternative system wherein lines on a document are scanned, fed into a memory, and read out to a print head for printing in the same order per line as the document was scanned. Yet another system is shown in Paranjpe et al., U.S. Pat. No. 4,112,469 in which the pixels are printed as soon as they are scanned. These systems require synchronization of scanning and printing.

SUMMARY OF THE INVENTION

The present invention provides for reformatting of the pixel information received in a simple and efficient fashion that is flexible enough to handle many conceivable printing element patterns.

This is provided primarily by an apparatus and method for printing an image formed of pixels printed selectively at pixel locations over a predetermined area of a print medium, which pixel locations are distributed along lines having centers spaced a predetermined interline distance apart. This aspect of the invention is usable with a generator for generating a sequential line-by-line stream of data elements defining the image formed of pixels printed selectively at pixel locations. Included in the apparatus is a memory for storing the image-defining data elements in the order in which they are received from the data generator. A print head having a plurality of pixel-printing elements is disposed in a predetermined arrangement for printing selectively a corresponding plurality of pixels simultaneously. The print head is moved to align the pixel-printing elements with respective pixel locations relative to a print medium for printing the plurality of lines forming the image. The pixel location corresponding to a selected one of the pixel-printing elements is determined for the current print head position. The addresses in the memory of all of the data elements corresponding to the pixel locations associated with the pixel-printing elements for the current print head position are calculated. The data stored in memory is then read to the print head in a sequence corresponding to the pixel locations associated with the pixel-printing elements.

In the preferred embodiment of this aspect of the present invention, the print head has two sets or subheads of pixel-printing elements. The elements within each set are offset by a first predetermined number of pixel locations. The sets are a second predetermined number of pixel locations offset from each other, with the first and second predetermined numbers not being equal. These two offsets are stored. Arithmetic logic is used to calculate each succeeding printing element location. The address of a first element of the second set is determined by changing the value of an address of a pixel-printing element of the first set by an amount including the offset between the sets.

The size of the memory for storing the pixel data elements is substantially less than that required to store the data for an entire image. This may be referred to as a partial page memory. This memory "wraps around" from the end back to the beginning with address selection control maintained through the use of dynamic read and write pointers.

In particular, the present invention provides an image-data reformatting apparatus usable with a print head having a plurality of pixel-printing elements for printing an image formed by selectively printing pixels in an array of pixel locations within a predetermined area of a print medium. It is also usable with a source providing image-defining data elements in a predetermined sequence, with the print head being structured to require data elements in an order different from the predetermined sequence. The apparatus comprises an addressable memory for storing a predetermined number of the image data elements in the predetermined sequence. A write address pointer register or equivalent is coupled to the memory for assigning sequential addresses for storing the image data elements in the predetermined sequence. The addresses are repeated after a number of data elements equal to the predetermined number of data elements has been stored. A read address pointer register or equivalent is also coupled to the memory for reading data elements out of memory in a sequence corresponding to the pixel locations associated with the pixel-printing elements for each head position.

The memory preferably is of sufficient size for reading the stored data elements out of the memory before being replaced with data elements written to the same addresses. This assures that unread data will not be replaced by new data for other pixel locations. It is known that floating read and write pointers have been used to generate audio time delays and other special audio effects. However, the data is not resequenced. Their use as in the present invention in a video pixel data element reformatting process is new.

These and other features and advantages of the present invention will become apparent from a reading of the following detailed description of the preferred methods of practicing the invention in association with the accompanying drawings.

DETAILED DESCRIPTION OF THE PREFERRED EMBODIMENTS

Figure 1:
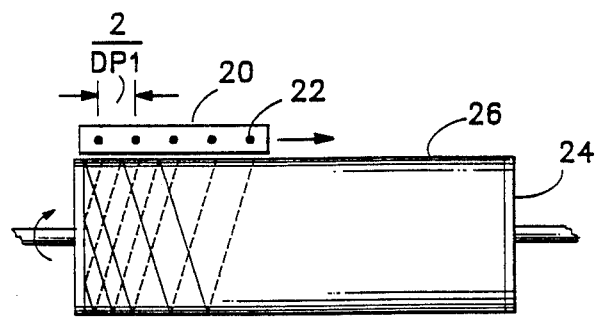
FIG. 1 is a simplified illustration of a conventional drum printer.
Figure 2:
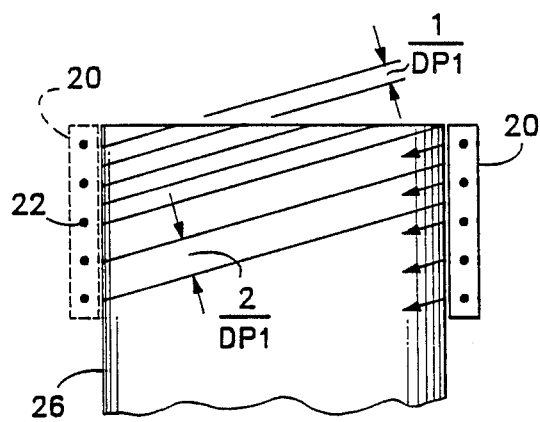
FIG. 2 is a face view of the head and print medium of FIG. 1.
Figure 3:
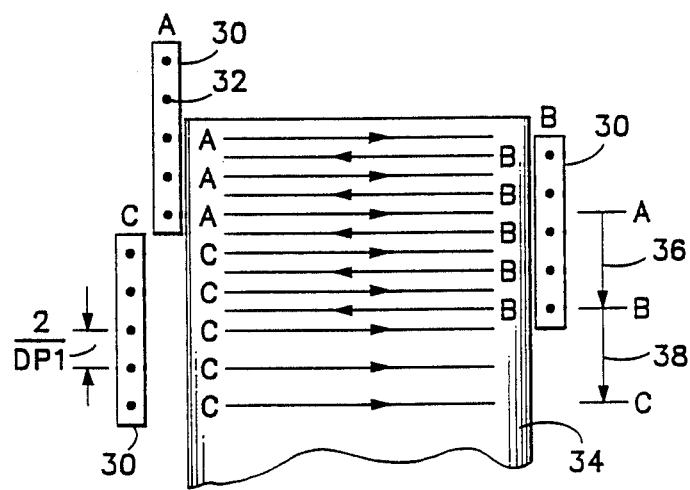
FIG. 3 is a view similar to that of FIG. 2 showing an alternative conventional embodiment.
Figure 4:
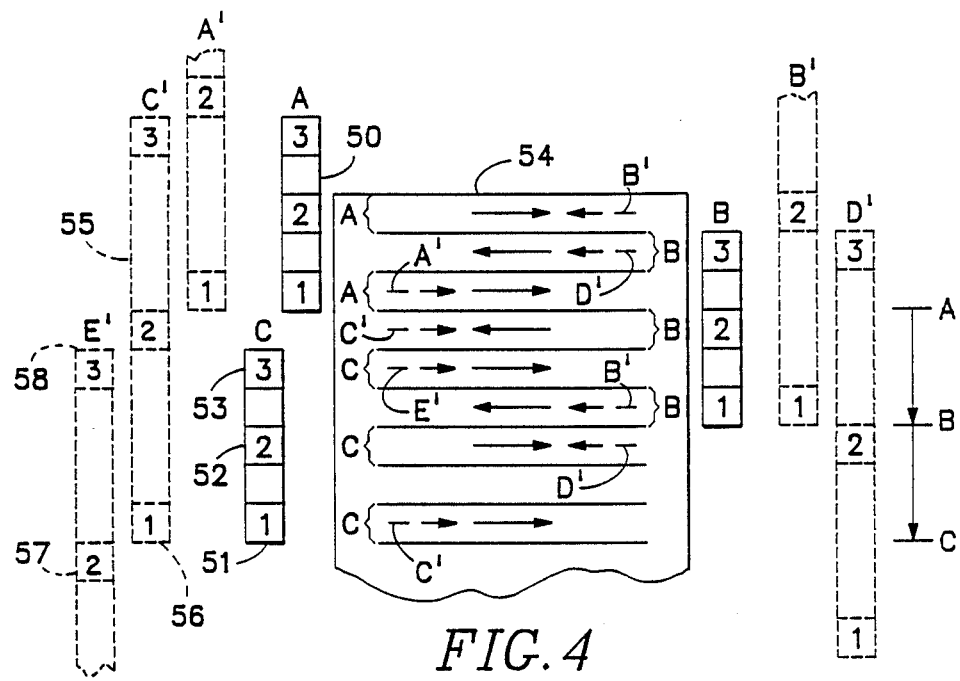
FIG. 4 is a view similar to that of FIG. 3 showing generally a head design of an apparatus made according to the present invention.

The preferred embodiment of the present invention provides interlaced set printing as is shown in FIG. 4.

A head 50 is formed of subheads 51, 52 and 53 (listed as 1, 2 and 3 in the figure). Each subhead prints a set of adjacent lines represented by the bracketed regions on a sheet 54 of a print medium. Again, the letters designate the alphabetical sequence of scans by head 50 across sheet 54. The solid arrows on the sheet indicate the direction of scan for the corresponding region.

The subheads forming head 50 are spaced apart by the same distance as the region scanned by each subhead. The area of sheet 54 printed by subhead 52 during scan B is adjacent areas printed by subhead 51 during scan A and by subhead 53 during scan C to completely fill in the overall area. The head is advanced the equivalent of three subhead regions, between scans.

A second embodiment of the subhead structure is illustrated by head 55 shown in dashed outline, including subheads 56, 57 and 58. The subheads print the same region width as the subheads of head 50. However, these subheads are the equivalent of four subhead widths apart. The corresponding scans are represented by the alphabet labels with a prime, such as A', and the scans are represented by arrows formed with dashed lines within each scan region. Even though the subheads are spaced farther apart, the head advances the same incremental distance relative to the sheet between scans.

Figure 5:
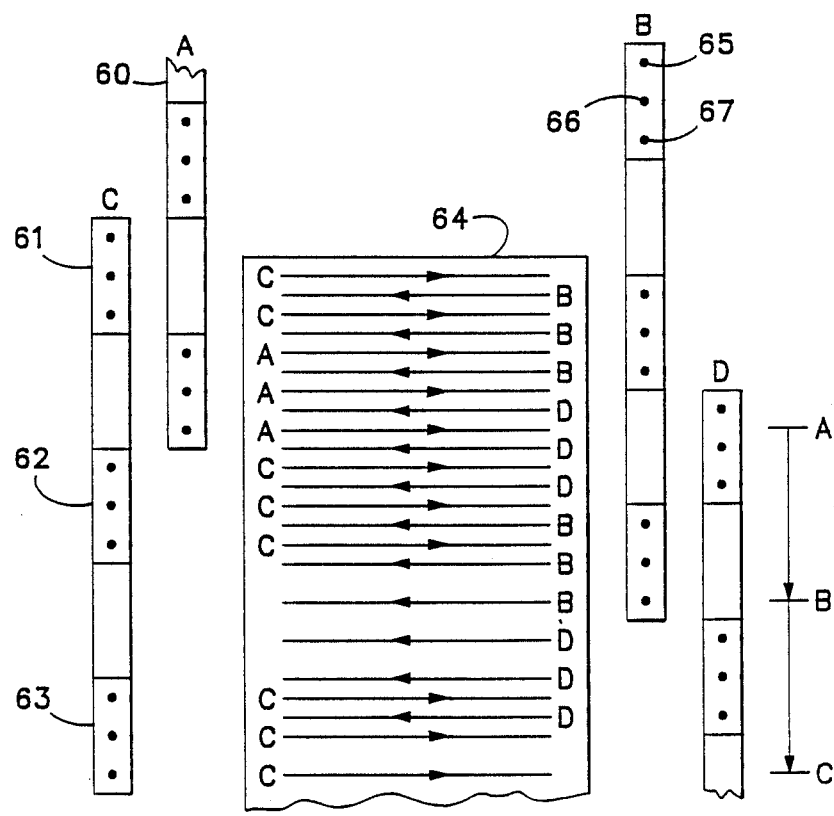
FIG. 5 is a view similar to that of FIG. 4 showing a head design for interlaced printing of lines within bands.

Printing incorporating interlaced line printing in the interwoven band or set printing of FIG. 4 is shown in FIG. 5. A head 60 formed of subheads 61, 62 and 63 is scanned over a sheet 64 of print medium. Each subhead has a series of three nozzles 65, 66 and 67 spaced the equivalent of two lines apart. The subheads are spaced the equivalent of seven lines apart. The head is advanced the equivalent of nine lines between scans, the same distance as the number of nozzles in the head.

Yet another example, not illustrated, is a head having twelve subheads with the space of nine lines between two nozzles in each subhead and the space of 101 lines between subheads. Each nozzle prints alternate 100 lines. The head spacing is ample to facilitate nozzle location at the desired spacing.

Figure 6:
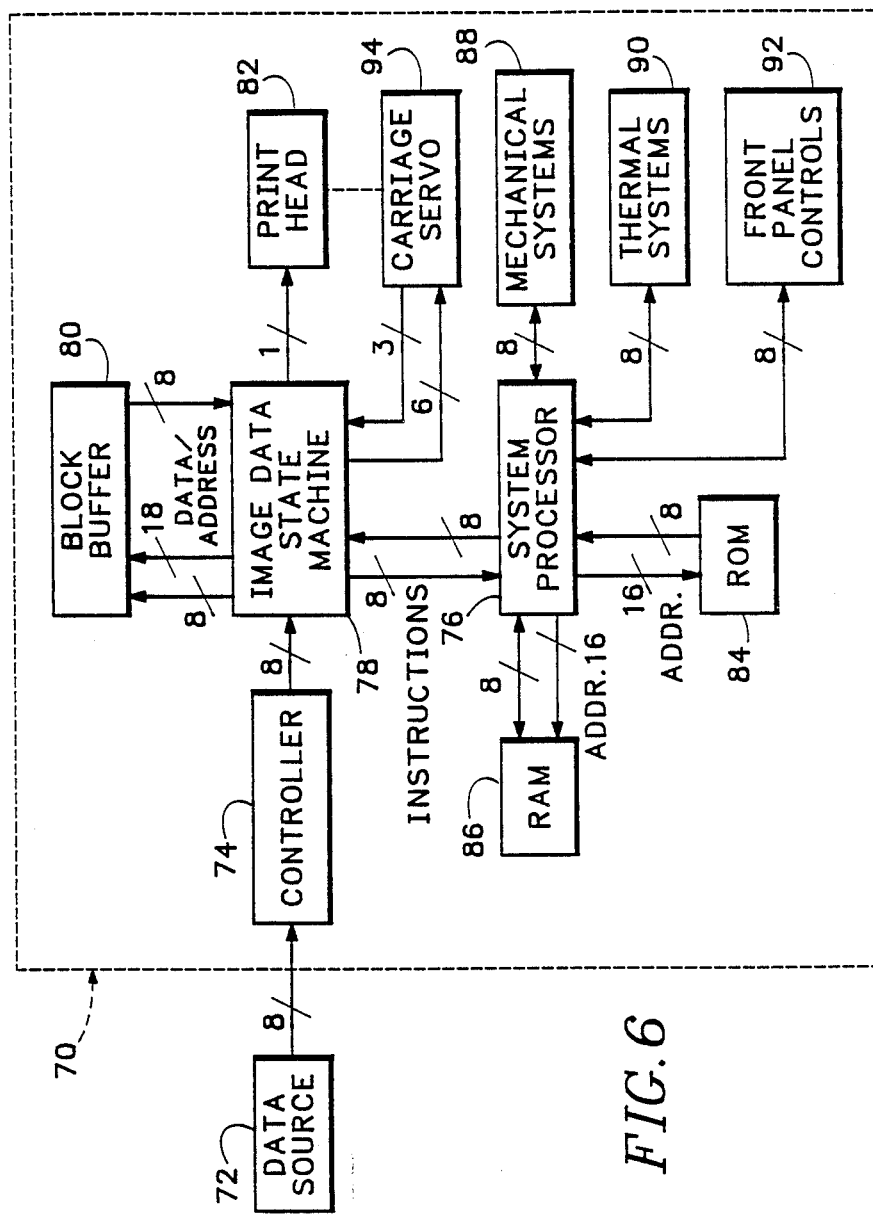
FIG. 6 is a general block diagram illustrating an apparatus made according to the present invention for printing as illustrated in the previous figures.

FIG. 6 is a block diagram of a printer 70 usable to perform the printing described with reference to FIGS. 4 and 5. Printer 70 receives data from a data source 72 at a controller 74. This controller acts as a communication interface with the data source.

From controller 74, the data is input into an image data state machine 78 which writes the data by sequential address in a block buffer (RAM) 80, also referred to as a partial page memory. The incoming data is conventionally in a raster-scan format. It is read out of buffer 80 for printing by a print head 82 in a sequence corresponding to the physical configuration of the print head array.

System processor 76 provides overall control of printer 70. It typically includes an operating program stored in a ROM 84 and retrievably stores information being processed in a RAM 86. The system processor receives dynamic information from the printer mechanical systems 88, thermal systems 90 and front panel controls 92. State machine 78 also exchanges positional information with a print head carriage servo 94 for coordinating data reading with print head position relative to a print medium.

Figure 7:
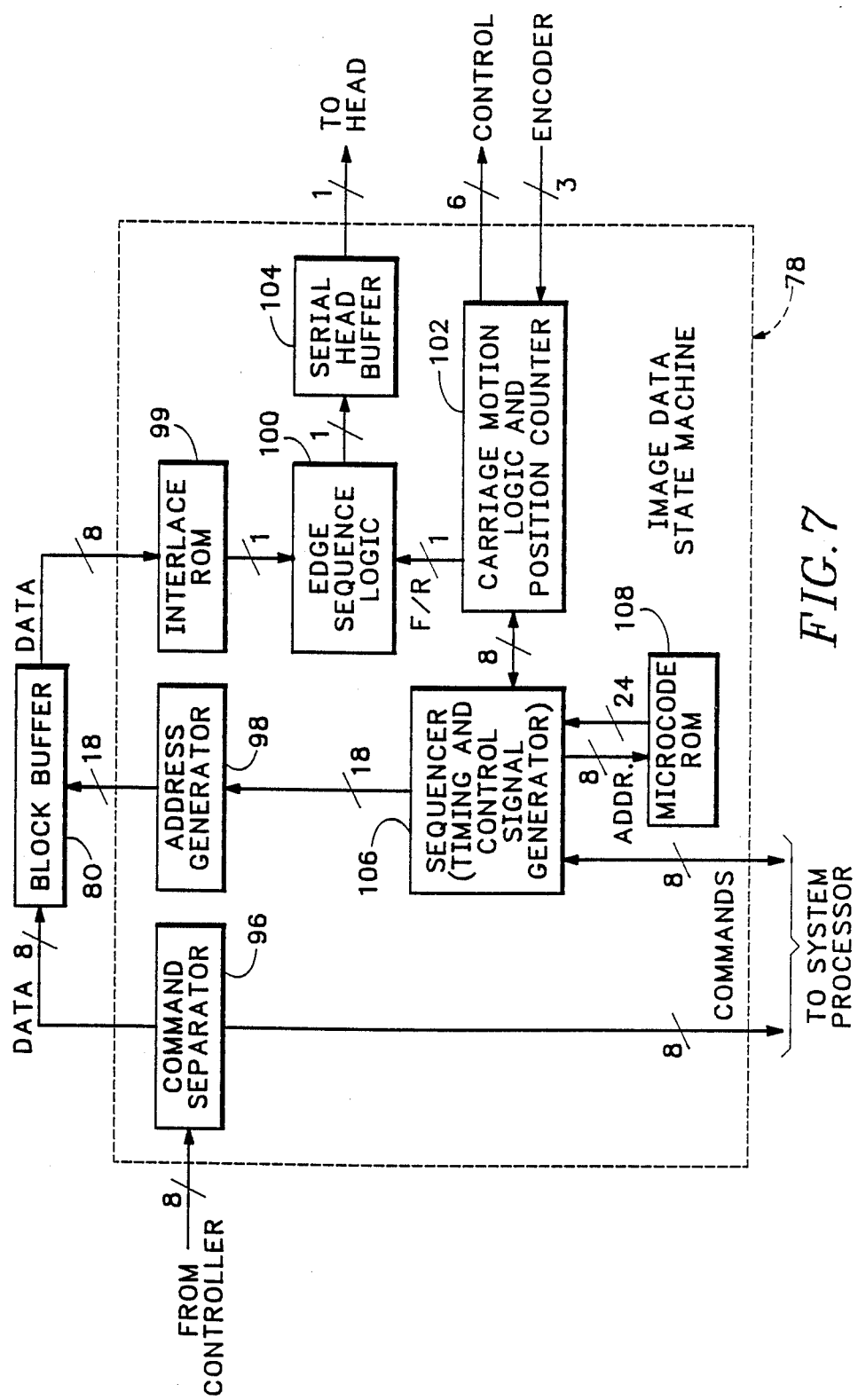
FIG. 7 is a more detailed block diagram of the image data state machine shown in FIG. 6.

FIG. 7 shows in further detail the structure of state machine 78 which controls writing and reading of pixel data. The information is received in a command separator 96 from controller 74. The command separator identifies the information as either data or system commands. The commands are routed to system processor 76. The data is fed into and out of block buffer 80 at addresses determined by an address generator 98. The data is read out into an interlace ROM 99 which functions, using a look-up table, to select the appropriate bit from each stored 8-bit data word to be used to control whether each jet will print. In special circumstances, the interlace ROM can be replaced by combination logic using the same inputs and outputs.

The eight bits of data coming from the block buffer contain two 4-bit pixels, each of which has 1 bit for each of the primary colors black, cyan, magenta and yellow. The eight bits of input to ROM 99 consist of seven bits of jet number, one bit of read address, and a mode selection. The seven bits of jet number select which of the four color bits are routed to the one-bit serial output.

Printer nozzle print suppression, which provides printing only on the image region of a print medium, is controlled through an edge sequence logic circuit 100 receiving position and direction (forward/reverse) signals from a position counter circuit 102. This circuit sends control information to the carriage servo circuit and receives position information from an encoder attached to the carriage.

This 1-bit data path continues through the edge sequence logic to a serial head buffer 104. This buffer functions as temporary storage of the 98-bit serial data stream coming from logic circuit 100 prior to sending it to the head.

A sequencer 106, also referred to as a timing and control signal generator, responds to supervisory commands from the system processor under the direction of a microcode stored in a ROM 108. The sequencer controls the generation of read and write addresses in address generator 98 to provide the data reformatting necessary to send the corresponding pixel data to the print head. This is coordinated with the print head carriage position provided through carriage motion logic and position counter circuit 102.

Figure 8:
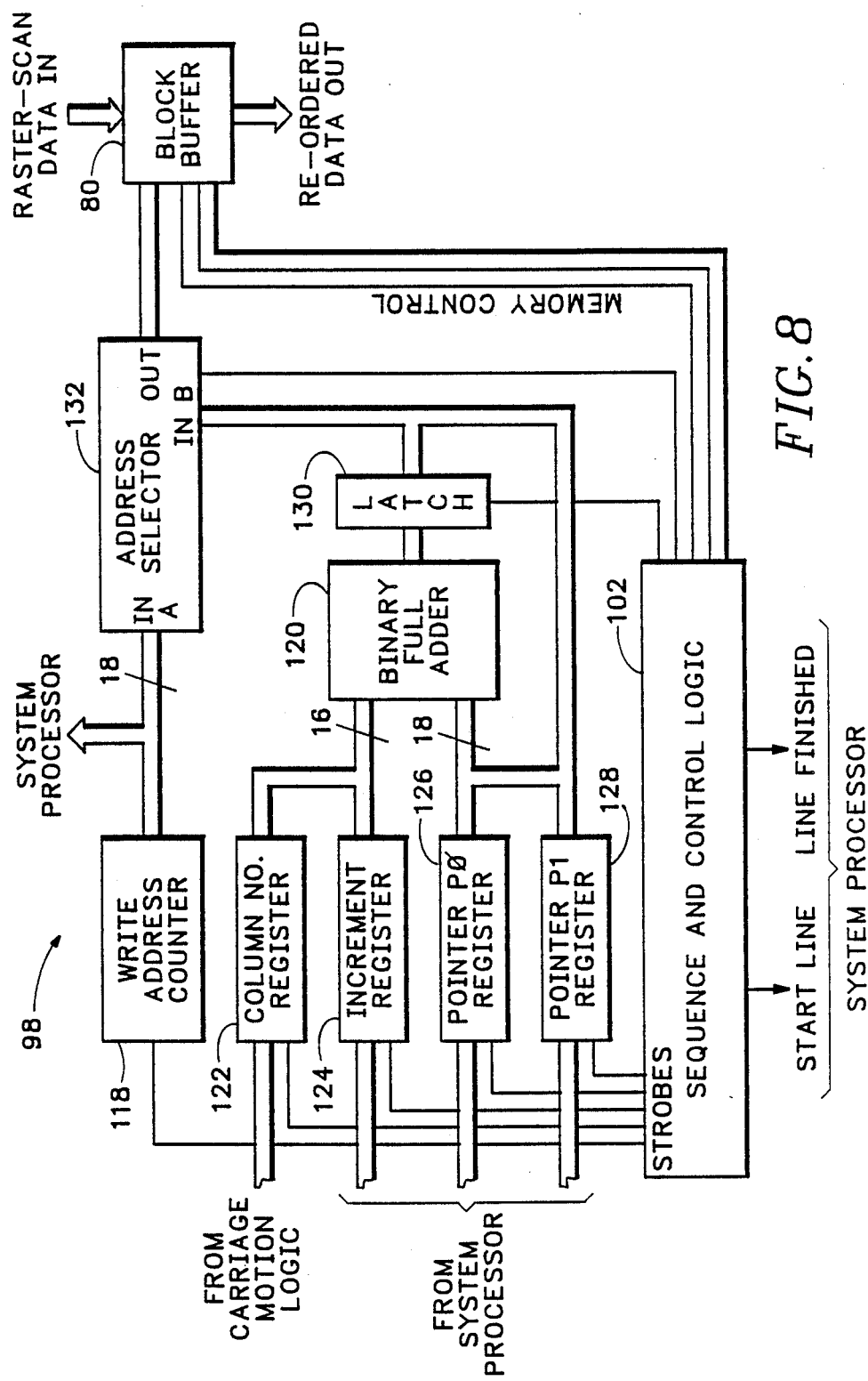
FIG. 8 is a schematic of the address generator and sequencer of FIG. 7.
Figure 9A:
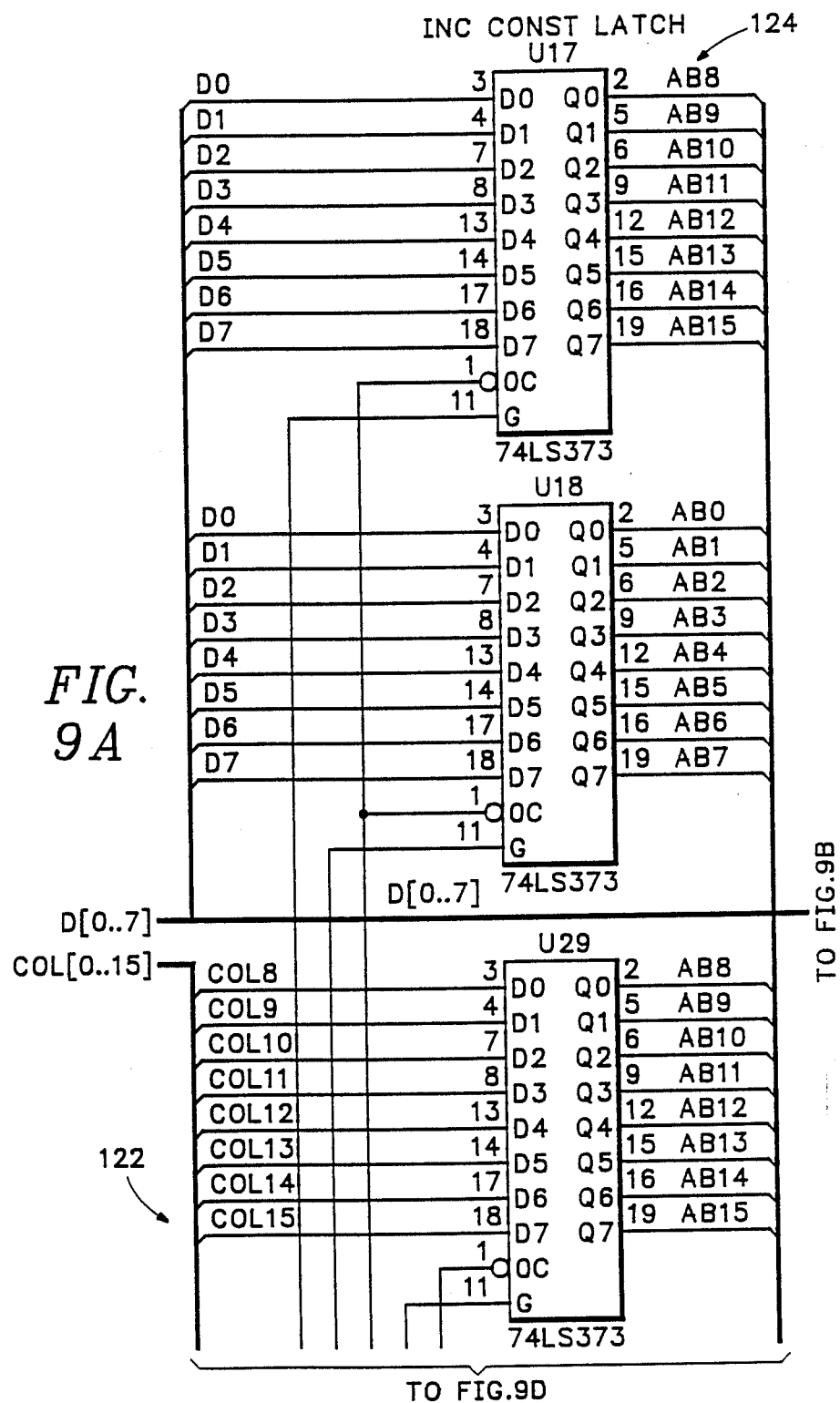
FIGS. 9A and 9B form a circuit schematic corresponding to the apparatus of FIG. 8.
Figure 9B:
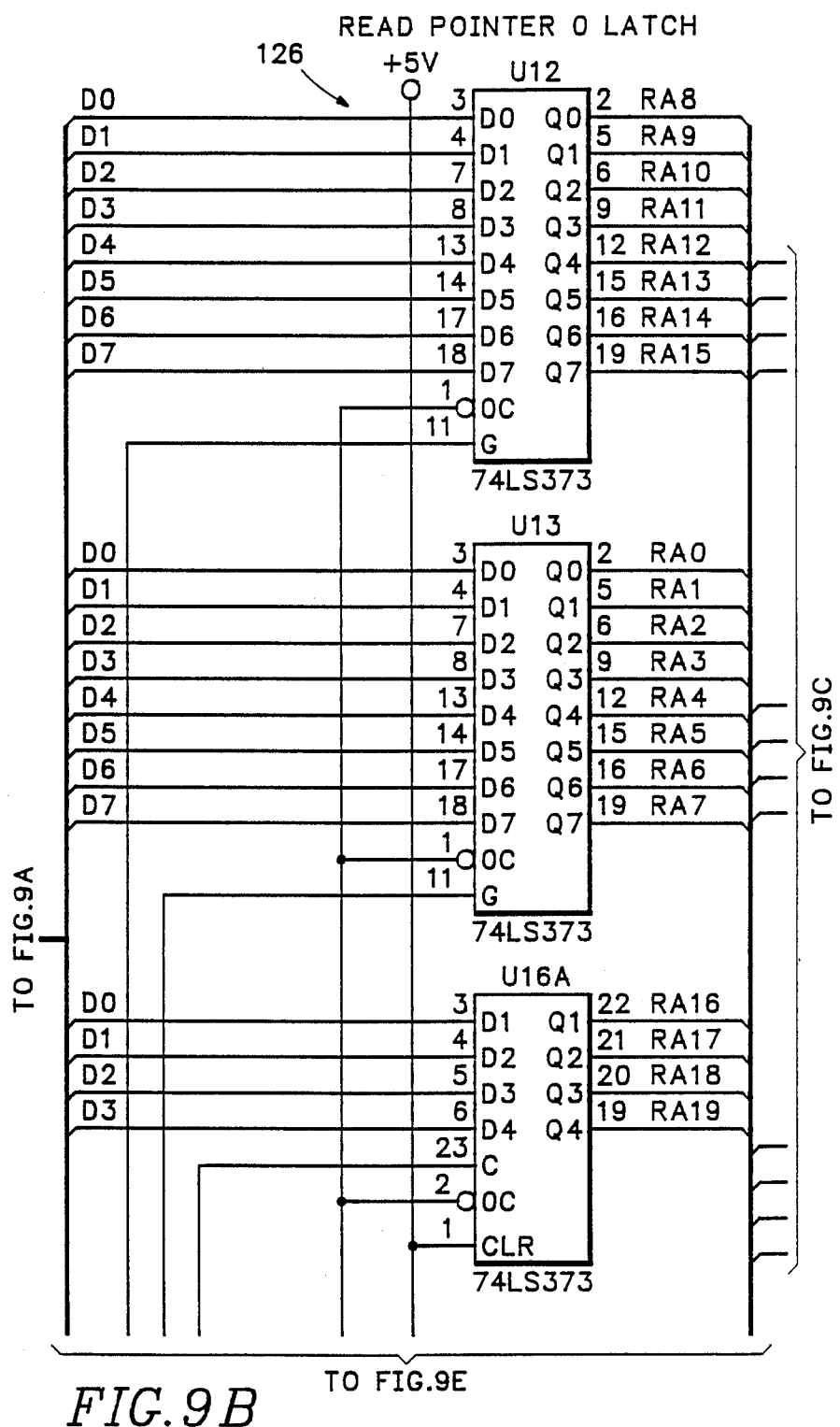
Figure 9C:
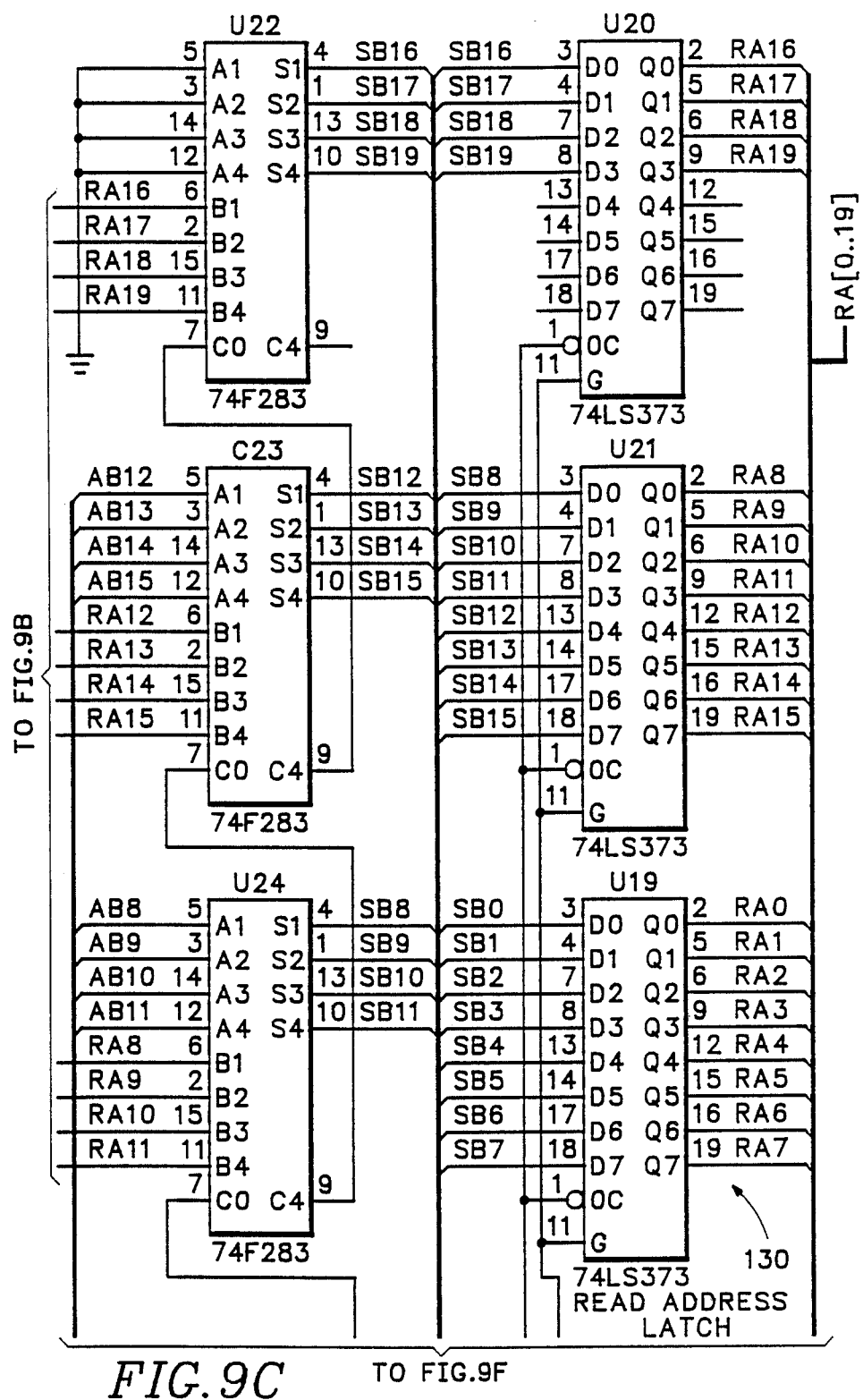
Figure 9D:
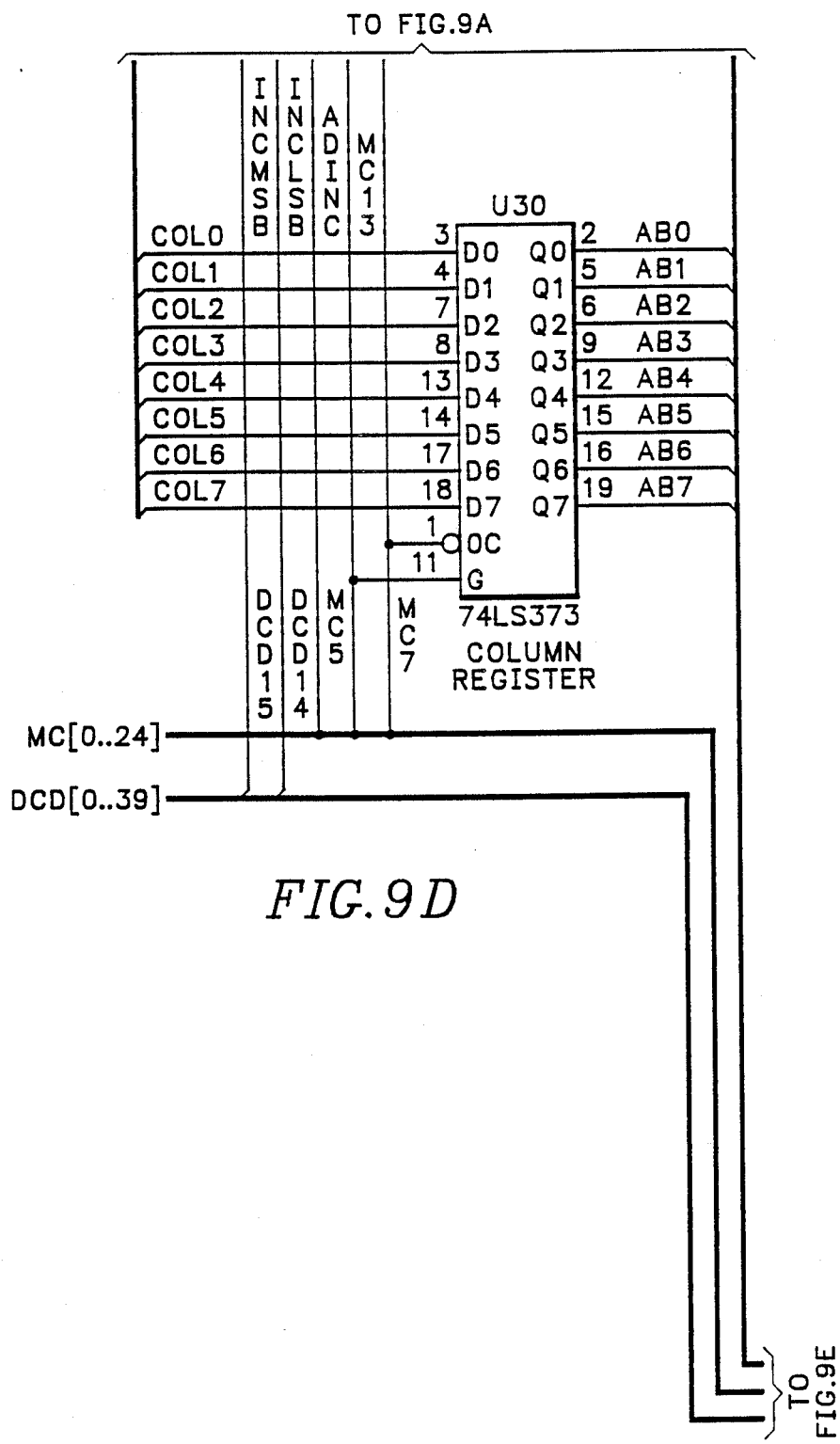
Figure 9E:
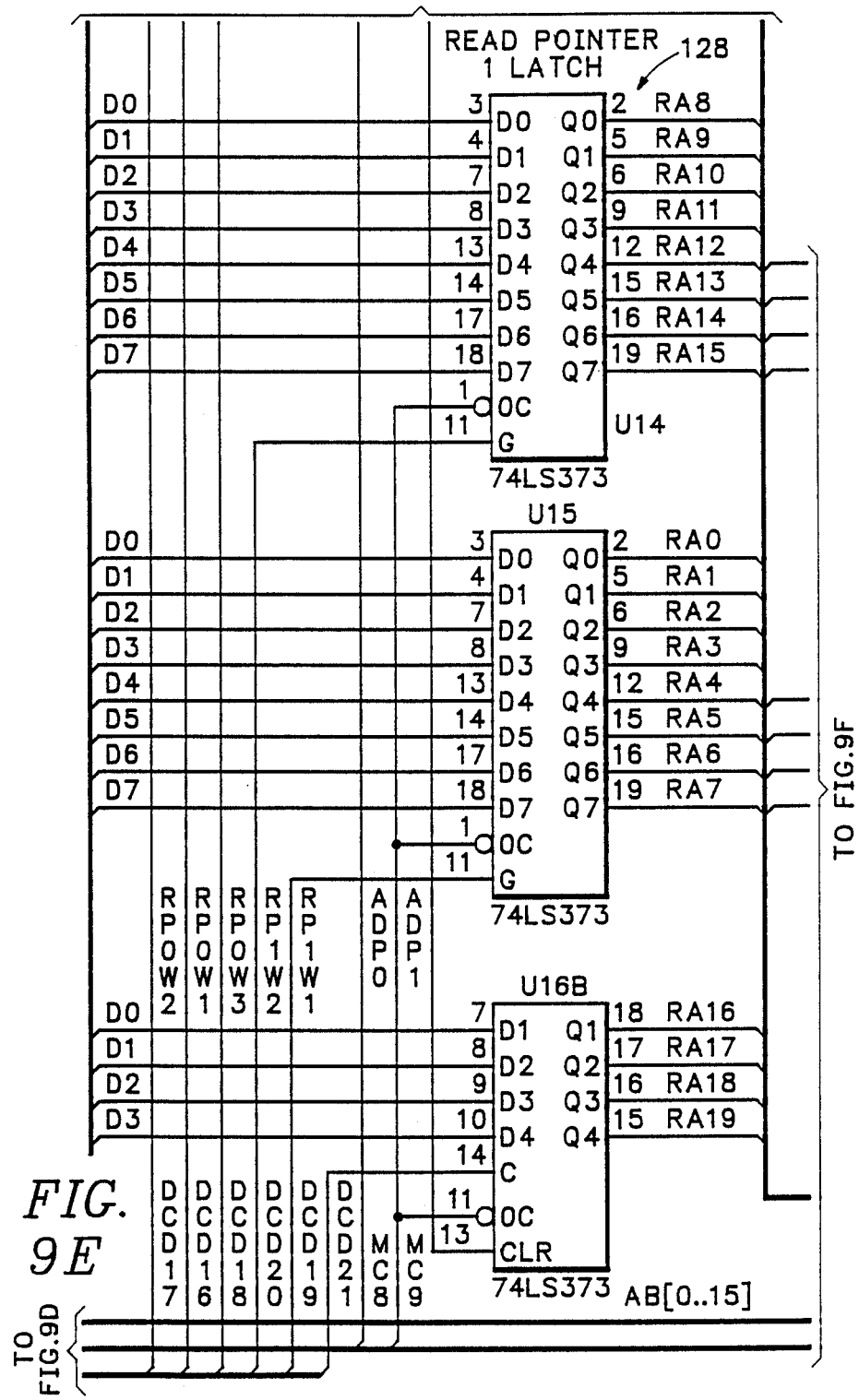
Figure 9F:
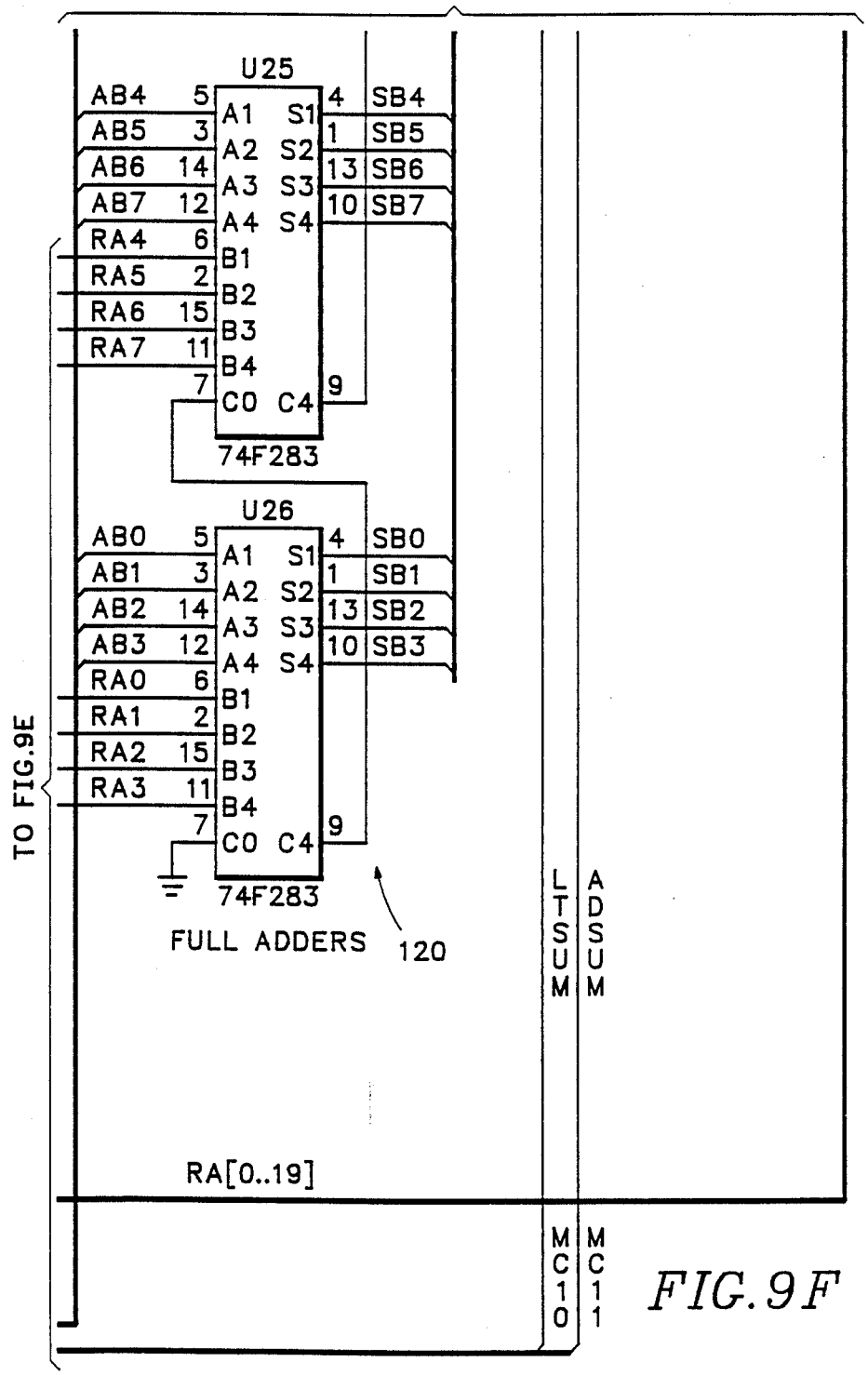
Figure 10:
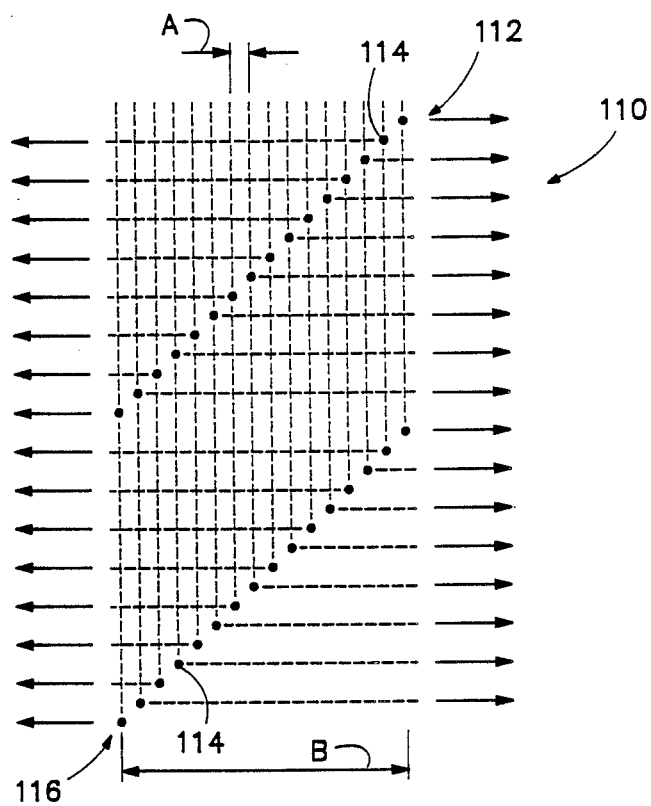
FIG. 10 is a further diagram of a specific ink-jet head array usable with the apparatus of FIG. 6.

FIG. 8 shows in further detail the structure of address generator 98, with a portion of the specific circuit schematic shown in FIGS. 9A and 9B. This embodiment is designed to control printing of a head nozzle array 110 shown in FIG. 10. Array 110 includes a first set 112 of nozzles 114 wherein each nozzle within the set is offset from each adjacent nozzle a horizontal distance A and a vertical distance of the width of one line. A second set 116 has the same number of nozzles 114 and same relative positioning of nozzles within the set. However, the top nozzle of the second set is offset from the bottom nozzle of the first set by a horizontal distance B (in pixel spacings or addresses) and a vertical distance of one line. The address offset of the top nozzle of the second set is thus equal to the total number of pixel locations in a line +B from the last nozzle of the first set.

In the actual embodiment, the distance A is equal to the width of ten pixels (or pixel locations). If a line contains 3000 pixels, then each nozzle is 2990 pixel locations sequentially from the next preceding pixel location within the set. The preferred head also prints with alternate nozzles when the head scans one direction and with the remaining nozzles when the head scans the other direction. Thus, it is only necessary to move the actual head relative to the print sheet on alternate scans. However, the addressing of printing heads in any scan direction then accommodates this increase in the effective spacing of the heads. The set interlaced printing illustrated in FIGS. 4 and 5 is provided by increasing the spacing between sets 112 and 114. Also, in the actual embodiment, each set contains 48 nozzles, and the two sets are spaced horizontally from each other rather than vertically, as shown. This embodiment is useful for providing a capability of both black (one subhead) and color (the other subhead) printing. Within the color subhead, three basic colors, such as the three subtractive printing colors of cyan, magenta and yellow, can be provided by multiple sets of three consecutive nozzles within the subhead or by three blocks of nozzles within the subhead. This then is a form of interlaced printing.

Printer 70 can accommodate either design. With little modification, it will be seen that other designs can also be accommodated. For instance, the designs of FIGS. 4 and 5 are accommodated by adjusting both the increment value within a subhead, and the offset between subheads.

Incoming raster-scan format data is written into block buffer 80. The addresses that govern the memory locations that the incoming data is written into are generated by a simple write address up-counter 118 that is incremented each time that a data byte is written into memory. Thus the pixel data is written into the memory starting at location 0 in the same order in which it comes in from the controller or data source. The system processor can at any time read the current value of the address counter to determine how much data is stored in the memory.

When the block buffer memory contains enough data to allow printing to begin, the data reformatting process begins. From this point on the reformatting process and memory access are under control of the sequence and control logic of sequencer 106. This control is provided by the microprogram stored in ROM 108.

Reformatting the pixel data is accomplished by computing the addresses from which the pixel data is to be read in a particular order, different from the sequential order in which the data was written. This address calculation is performed by a binary full adder 120 using numbers from a column number register 122, an increment register 124, a pointer P0 register 126, and a pointer P1 register 128 in combination with the previous calculated address, stored in a latch 130. An address selector 132 selects between the address in write address counter 118 and latch 130, depending on whether data is being written into or read out of block buffer 80.

The column number register stores a number provided by logic circuit 102 which controls the print head position, and is defined as the number of the pixel location (column) in from the left edge of the image that lies under the right-most nozzle of the first set of nozzles of the print head. The numbers in the other three registers are calculated and stored by the system processor. The number in the increment register remains constant for the entire image, and is related to the image width and print head design. For the particular print head mention previously, it is equal to the image width (in pixel locations)—A. In the embodiment described above, it is 3000 pixel locations—10, or 2990. In the embodiment shown in FIG. 10 where A is equal to the width of one pixel location, the increment value is 2999 if all nozzles are used.

The numbers in the pointer registers are used to relate the current read address to the address at which the data was originally written. When the first printing position of the print head is established for the current pass in an image printing operation, the number in pointer P0 register is the memory address of the first pixel location in the top line of the portion of the image to be printed. For a split head array as actually used in this embodiment having vertically spaced nozzle sets, the value in the pointer P1 register corresponds to the value in the P0 register minus the horizontal offset B, which is the offset between the two rows of jets in the print head. For the head array shown in FIG. 10, the value in the pointer P1 register corresponds to the line length in pixel locations plus the offset B.

Figure 11A:
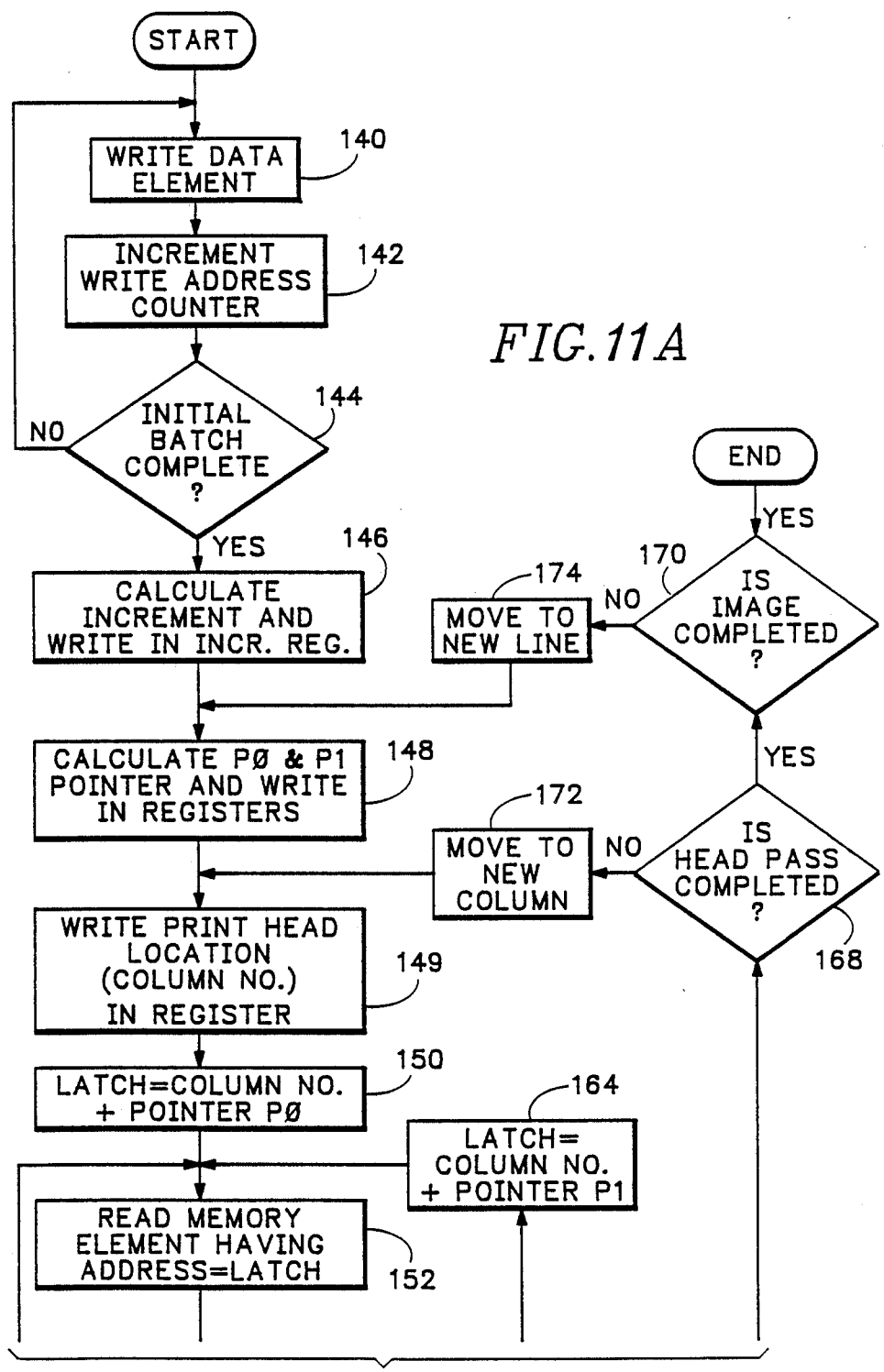
FIG. 11 is a flow chart illustrating the data reformatting operation of the apparatus of FIG. 6.
Figure 11B:
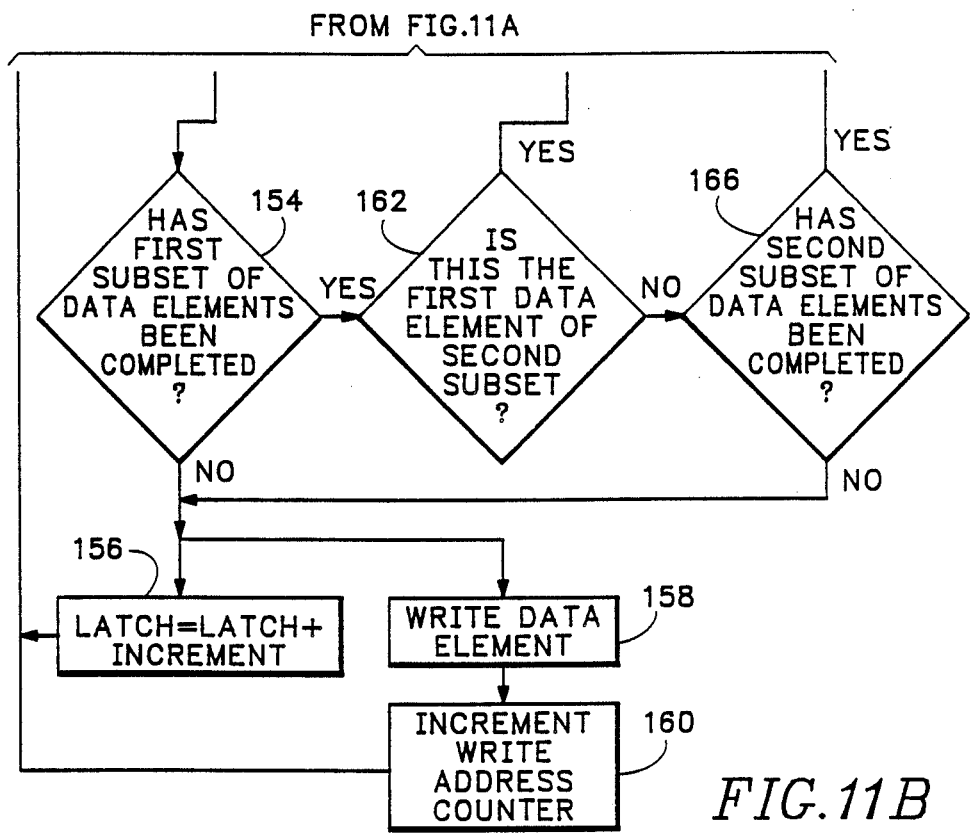

FIG. 11 is a flow chart showing the various steps in printing an image. Incoming data elements are written at block 140. The write address counter is incremented at block 142 and a decision is made at decision block 144 on whether enough data is written to begin printing. If not, then another incoming data element is written at the last incremented address.

If the initial batch of data is written into memory, the increment A is calculated and written into the increment register at block 146. The values for pointers P0 and P1 are calculated and entered into the corresponding registers at block 148. The print head location, as a column number, is entered into the column number register. An initial read address is entered into latch 130 which is equal to the sum of the column number and pointer P0 registers at block 150. The memory element having this address is read from memory at block 152.

If the first set of data elements, as determined at decision block 154, has not been read, then the new read address in latch 130 is set equal to the prior address plus the increment value, at block 156. Concurrent with this process, another incoming data element, if available, is written into memory and the write address counter incremented at blocks 158 and 160. The newly addressed memory data element is then read at block 152 and a determination made again whether the first set of pixel data elements has been read.

If so, a determination is made at decision block 162 as to whether this next data element to be read is the first data element of the second set. If it is, then the address in latch 130 is set equal to the column number plus the value of pointer P1 register, for the actual head embodiment having two vertically spaced nozzle sets. For the embodiment of FIG. 10, the latch is set equal to its prior value plus the offset of pointer P1. The data element at this memory location is then read and the address values incremented and read as with the first set of data elements until the end of the second set is reached. This determination is made at decision block 166.

Once the end of the second set of nozzle positions is reached, a determination as to whether the current pass of the print head is complete is made at block 168. If so, and the image has not been completed, as determined at block 170, then the print head is moved to a new column for the current pass at block 172. The new column number is written in register 122 at block 149 and the process continued until the had pass is completed.

At the end of each head pass a determination is made at block 170 to determine if the image is complete. If not, the head is moved to position for a new set of lines and a new pass at a block 174. The steps previously outlined beginning with setting the P0 and P1 pointers at block 148 is continued until the image is completed, at which point the printing process is terminated.

The design of the memory array, referred to as block buffer 80, used with the above pixel reformatting logic poses some special challenges. It was not considered desirable to make the memory array large enough to store an entire image at one time, due to the very large size and consequent high cost of such a memory. It was therefore necessary to find a way to use a smaller and partial-page memory for temporary storage during the pixel reformatting process. The reformatting must be accomplished without losing the relationship between the write and read addresses, and without complicating the algorithm used to handle the pixel reformatting.

Memory 80 has a size which is less than enough to print an entire page or image. When sufficient data has been entered to fill the memory, it wraps around from the end back to the beginning, together with dynamic read and write pointers. The wraparound feature of the memory is achieved by generating the write addresses with a simple up-counter that is matched in length to the memory length. For example, if the memory is structured as 256K of 8-bit words, the associated write counter is configured to overflow at a count of 256K (262144). Thus, when the last byte of memory is written, the next byte to be written will be at address 0.

To use a memory such as this, it is necessary to keep track of the pointers. Memory addresses have significance only with respect to these pointers. In other words, data is written at locations starting with or relative to a write pointer, and data is read at locations related to or starting with a read pointer. Keeping the correct relationship between the read and written data thus reduces to a problem of keeping the two pointers the correct number of address locations apart in memory. In the preferred embodiment described, this is done by the system processor. The read pointer starts at location 0. External logic allows data to be written to the memory and the write pointer counter 118 is incremented as described with reference to FIG. 11, until the write pointer is a set number of pixel data elements beyond the read pointer. In the preferred embodiment, this set number is 50 lines times the number of pixel locations that the image is wide, such as 3000 pixel locations. Since the print head prints on 48 consecutive lines, this assures enough data elements for a complete pass. This is the value of the initial batch of data elements read into memory as described in the flow chart of FIG. 11.

During the reading and printing cycle, enough new data bytes are written to memory to allow the next head pass also to take place. At the end of the current pass, the system processor checks the value of the write pointer, inputting additional data as required, so that it is again at least the same set distance ahead of the read pointer. Thus, pixel data is always decoded with respect to the read pointer stored in the pointer P0 register 126, and the pixel reformatting logic need not be concerned with absolute memory addresses at all.

By using this partial page memory concept, the minimum size for a memory is much reduced from that for a full page. The minimum size for the memory becomes approximately two times the number of addresses between the read and write pointer. Since two pixel data elements can be stored at each 8-bit address location, this is equivalent to 300K of storage elements, or 150K of memory. Thus, the 256K memory is ample to accommodate this method.

A key requirement for the proper operation of the memory as described is that any logic devices or software operations that can affect the memory address must be arranged so as to overflow all at the same value. Thus, if the memory consists of 256K words, the memory address counter, the binary full-adder 120, and the software algorithms that compute read pointers must all be designed so as to overflow to 0 when the count reaches 256K.

Figure 12:
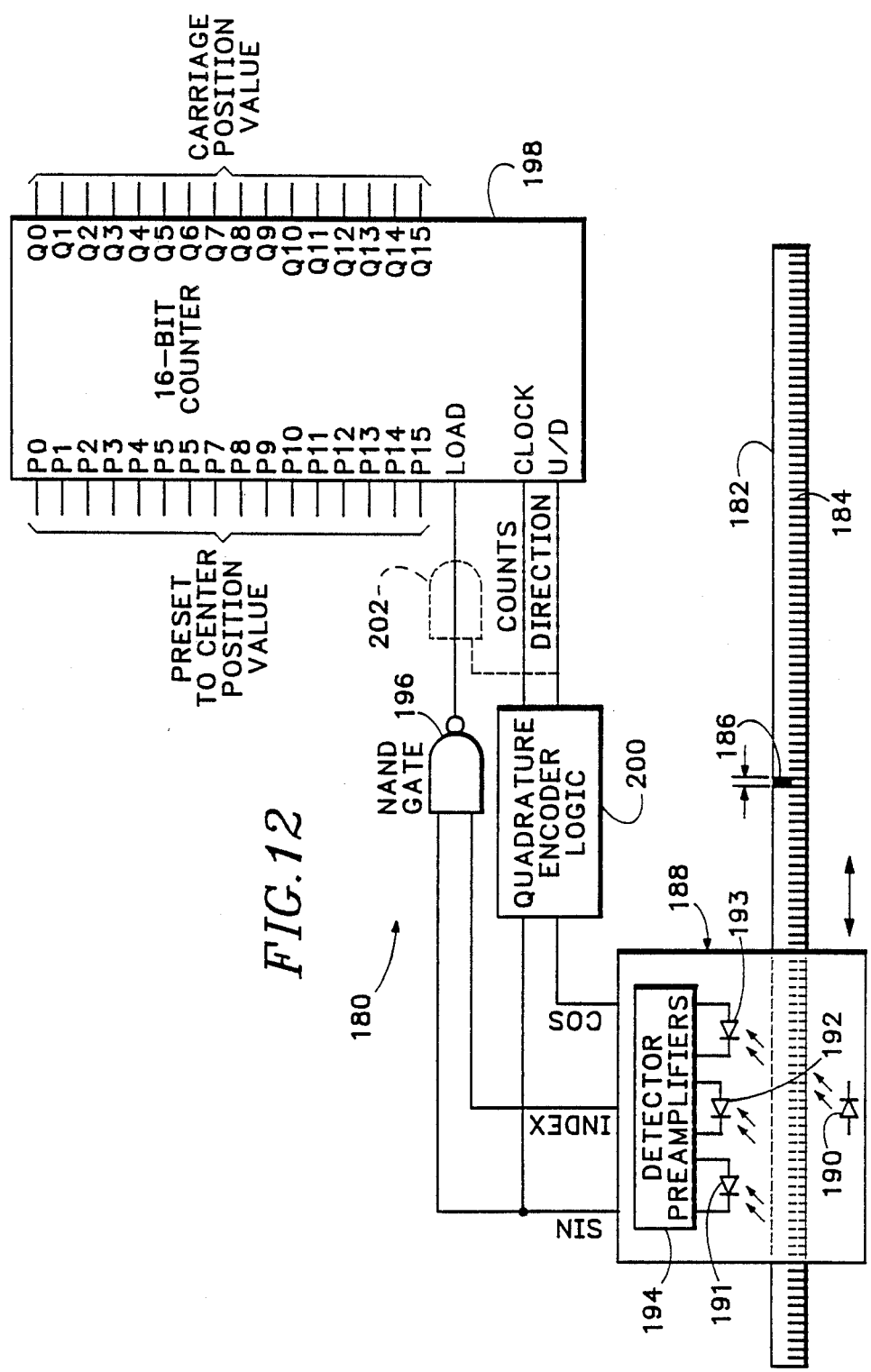
FIG. 12 is a diagram illustrating the structure of a position encoder included in the apparatus of FIG. 6.

FIG. 12 illustrates the structure of an encoder 180 made according to the invention. The encoder includes a linear relative position strip 182 having a plurality of incrementally spaced markers 184 positioned along it. Strip 182 is long enough to more than cover the maximum width that a print medium image will have. Strip 182 is attached to a frame which stays fixed relative to the print medium.

An index marker 186 or flag is preferably positioned centrally of the strip to identify this fixed position on the strip. This index marker is used to calibrate the carriage position sensing system, as described in the Summary of the Invention in order to correct for any errors in position sensing due to mechanical vibration or electronic noise, and to assure that these variances are not cumulative.

A position marker sensing unit 188 is fixed relative to the print head on the printer carriage and travels along strip 182 so that markers 184 and 186 are sensed. Included is a light emitting diode 190 and corresponding photodiodes 191, 192 and 193. Diodes 191 and 193 are positioned to sense the incremental markers 184 in such a way that they produce signals that are 90° out of phase. Diode 191 is shown to produce a sine wave signal relative to the cosine wave signal of diode 193. Diode 192 senses the occurrence of index marker 186 in a way that is synchronous with the sine wave signal generated by diode 191.

The photodiode signals pass through appropriate amplifiers 194. The sine wave and index signals pass through a NAND gate 196 and the resultant signal is input into the load port of a 16-bit counter 198. The counter has the 16 bits of input preset to a position value that represents the position of index marker 186. The two cosine and sine wave signals also pass through a quadrature encoder logic circuit 200 to obtain a signal identifying the occurrences of markers 184, which is input into the clock port of counter 198. A second signal indicative of the direction of the carriage is fed into the up/down count control port of the counter, so that the count in the counter changes in a manner consistent with the direction of travel of the carriage.

In operation, when the marker sensing unit moves past the index marker, a "high" signal is generated at the "index" output. Because the width of the index mark is equal to the width of the incremental marker spacing, it overlaps two adjacent output clock transitions. By including the NAND gate as shown, only one of these clocks is selected and is sent to the counter. Because of the nature of the 16-bit counter, the data present at the "preset" inputs of the counter will be preset into the counter and will appear at its output on the next rising edge of the clock after the load input goes low. The number present at the preset inputs of the counter can be chosen so that any possible position of the carriage corresponds to a positive count position greater than 0. This greatly simplifies the position control system.

Once the carriage has passed the index marker causing the counter to be preset, it can move forward and back as desired, and the outputs of the counter count up and down accordingly. In the absence of noise, interference, etc., the next time the counter moves past the index marker the value in the counter outputs equals the value that gets preset by the marker, resulting in no net effect caused by the presence of the marker. However, if the counter has accumulated any net position errors for any reason, these errors are removed and the counter again preset to the proper value upon passing the index marker.

As shown in FIG. 12, index marker 186 is preferably located in the middle of strip 182 which represents the middle of travel of the carriage between the sides of images to be printed. Thus, regardless how narrow an image is printed, so long as it is printed at least at the center of the page of print medium, the index marker will be sensed with every scan of the carriage. Certainly other positions would produce the same result, depending on the minimum image width printed.

An alternative embodiment of the generation of the "load" signal for the counter is shown in dashed lines in FIG. 12. In this embodiment, an AND gate 202 is located between NAND gate 196 and the load port of the counter. The AND gate receives the output of gate 196 as well as the direction signal from quadrature encoder 200. This allows the presetting of the counter to only take place during the reverse direction pass of the carriage, and inhibits it during the forward pass, which may be desirable in some circumstances.

It will be seen that this encoder provides incremental counting with an absolute position reference that is rechecked every time the encoder passes the center (or other equivalent point) of travel, and that positive only position values are generated for any position within the range of the carriage. Such a position referencing scheme eliminates the need for the counter to ever reach a value of zero.

While the invention has been described with reference to the foregoing preferred method and embodiment, it will be apparent to those skilled in the art that variations may be made without varying from the spirit and scope of the invention as defined in the claims.

We claim:

1. An apparatus for printing an image formed of pixels printed selectively at pixel locations over a predetermined area of a print medium, which pixel locations are distributed along lines having centers spaced a predetermined interline distance apart, and usable with means for generating a sequential line-by-line stream of data elements defining the image formed of pixels printed selectively at pixel locations, comprising:

memory means for storing the image-defining data elements in the order in which they are received from the data generating means;

a print head having a plurality of pixel-printing elements disposed in a predetermined arrangement for printing selectively a corresponding plurality of pixels simultaneously;

means for positioning the print head to align the pixel-printing elements with respective pixel locations relative to a print medium for printing the plurality of lines forming the image;

means defining the pixel location corresponding to one of the pixel-printing elements associated with each print head position;

means responsive to the pixel-location defining means for calculating the addresses in said memory means of all of the data elements corresponding to the pixel locations associated with the pixel-printing elements for each print head position; and means responsive to the calculating means for reading to the print head the data stored in memory in a sequence corresponding to the pixel locations associated with the pixel-printing elements for each print head position.

2. An apparatus according to claim 1 wherein the pixel-printing elements are spaced on the print head so that each pixel-printing element is associated with a predetermined number of sequential pixel locations from an adjacent pixel-printing element, wherein the calculating means arithmetically calculates the addresses corresponding to each pixel-printing element from the pixel location defined by the defining means and the spacing of pixel-printing elements on the print head.

3. An apparatus according to claim 2 wherein at least a subset of the pixel-printing elements is associated with pixel locations a first predetermined number of sequential pixel locations apart, and the pixel location defining means includes means for storing the pixel location associated with the one pixel-printing element, means for storing the predetermined number of pixel locations between the pixel-printing elements of the subset, and arithmetic logic means for changing a previously calculated read address by the first predetermined number of pixel locations to determine another read address.

4. An apparatus according to claim 3 wherein the storing means comprises register means for storing the numbers and the calculating means further comprises binary adder means responsive to the register means for adding the values of two register means to produce a read address, and latch means responsive to the output of the binary adder means for latching the read address until a subsequent read address is latched.

5. An apparatus according to claim 4 wherein the memory means further comprises register means for storing a write address.

6. An apparatus according to claim 5 wherein the write-address storing register means further increments the stored write address each time a data element is written into the memory means.

7. An apparatus according to claim 4 wherein the memory means further comprises address selector means for selecting between a read address and a write address.

8. An apparatus according to claim 3 wherein the print head has two subsets of pixel-printing elements with one subset being a second predetermined number of pixel locations offset from the other subset, with the first and second predetermined numbers not being equal, and the calculating means includes means for storing the offset, and the arithmetic logic means changes an address of a pixel-printing element of one subset by an amount including the offset to determine an address of a pixel location associated with a pixel-printing element of the other subset.

9. An apparatus according to claim 3 wherein the two subsets of pixel-printing elements are each in a linear row, with the two rows being noncolinear.

10. An apparatus according to claim 9 wherein the rows are parallel.

11. An apparatus according to claim 3 wherein the data generating means generates data defining the area of the print medium on which to print an image, and the calculating means recalculates the first predetermined number for each image.

12. An apparatus according to claim 1 wherein the memory means stores data elements into memory while read addresses are being calculated.

13. An apparatus according to claim 12 wherein the memory means stores, prior to beginning printing, an initial set of data elements sufficient to print the pixels corresponding to the data elements associated with a single pass of the print head over the print medium.

14. An apparatus according to claim 13 wherein the memory means has a predetermined data element capacity and associated first and last memory addresses, and the calculating means calculates a read address that is the first memory address when the next address beyond the last memory address is calculated.

15. An apparatus according to claim 13 wherein the memory means stores the incoming data elements sequentially beginning with the first memory address, and when the predetermined capacity is reached, stores subsequent data sequentially beginning with the first memory address.

16. An apparatus according to claim 15 wherein the storing means further comprises register means for storing the write address of the next data element to be stored.

17. An apparatus according to claim 16 wherein the storing means increments the address in the write-address storing register means each time a data element is written into memory.

18. An apparatus according to claim 17 wherein the write-address storing register means stores the first memory address when it is incremented while storing the last memory address.

19. An apparatus according to claim 1 wherein the calculating means stores the memory address of a base pixel location on a line being printed by one of the pixel-printing elements for a predetermined position of the print head relative to the print medium during a current pass of the print head, and the calculating means calculates the pixel location address for each position of the print head during the current pass based on the position of the print head at each position relative to the position of the print head for printing at the base pixel location.

20. An apparatus according to claim 19 wherein the calculating means further comprises means for storing a current head position, and calculates a current address based on the difference between the base pixel location and the current head position.

21. An apparatus according to claim 20 wherein the calculating means further comprises means for storing the address associated with the base pixel location.

22. An apparatus according to claim 21 wherein the base pixel location is a first pixel location associated with the first pixel-printing element on the print head to pass over the image on the current pass.

23. An apparatus according to claim 19 wherein the calculating means recalculates the new address of the base pixel location when a new pass is started.

24. A method of printing an image formed of an array of lines and columns of pixel locations printed selectively with pixels over a predetermined area of a print medium, which lines have centers spaced a predetermined interline distance apart, using a print head having a plurality of pixel-printing elements in a predetermined configuration definable in terms of associated positions of pixel locations on an image to be printed, the method comprising the steps of:

storing in an addressable memory data elements corresponding to pixel locations of an image to be printed;

positioning the print head relative to a print medium so that at least one pixel-printing element is positioned to print a pixel on a pixel location of the image for which corresponding data elements are stored in memory;

determining the memory address corresponding to the pixel location of the one pixel-printing element;

calculating from the memory address corresponding to the pixel location associated with the one pixel-printing element the memory address corresponding to the pixel location associated with each of the other pixel-printing elements using the defined configuration of pixel-printing elements;

reading the data elements corresponding to the memory addresses for each of the pixel-printing elements;

transmitting the read data elements to the associated pixel-printing elements; and printing with each of the pixel-printing elements as defined by the transmitted data elements.

25. A method according to claim 24 further comprising the steps of positioning the print head so that the pixel-printing elements move to different pixel locations, determining the new memory address of the one pixel-printing element and repeating the steps of calculating, reading, transmitting and printing.

26. A method according to claim 25 wherein the pixel locations associated with pixel-printing elements for successive head positions are disposed in lines, and the steps are repeated until a set of lines are printed, after which the print head is positioned so that the one pixel-printing element is on a new line, and the steps are repeated again, until the image is printed.

27. A method according to claim 24 further comprising the steps of determining a base address corresponding to a pixel location on one line along which the one pixel-printing element passes; and determining, for any head position along the one line, the number of columns between the pixel location associated with the base address and the actual pixel location associated with the one pixel-printing element, whereby the step of determining comprises calculating the memory address associated with the one pixel-printing element based on the base address and the number of columns between the pixel location associated with the base address and the pixel location associated with the one pixel-printing element.

28. A method according to claim 24 wherein the step of storing includes storing fewer data elements in memory than are required to print the entire image.

29. A method according to claim 28 wherein the step of storing includes storing a sufficient number of data elements for printing all of the lines covered by the print head during a pass along the print medium.

30. A method according to claim 28 wherein the step of storing includes storing data elements in memory at addresses from which data elements have previously been stored and read during printing of the same image.

31. A method according t o claim 24 usable with a head having at least two subsets of heads with the pixel-printing elements in each subset being disposed in a linear configuration and having a predetermined spacing between adjacent pixel-printing elements, and there existing an offset between the two subsets different than the interelement spacing within each subset; wherein the step of calculating includes accounting for the offset when calculating an address of a pixel location associated with a pixel-printing element of the second subset from a pixel location associated with a pixel-printing element of the first subset.

32. A method according to claim 31 wherein the step of calculating further comprises computing addresses corresponding to pixel locations associated with additional pixel-printing elements in the second subset taking into account the predetermined spacing between pixel-printing elements in the second subset.

33. Image-data reformatting apparatus usable with a print head having a plurality of pixel-printing elements for printing an image formed by selectively printing pixels in an array of pixel locations within a predetermined area of a print medium, and a source providing image-defining data elements in a predetermined sequence, with the print head being structured to require data elements in an order different from the predetermined sequence, the apparatus comprising:
addressable memory means for storing a predetermined number of the image data elements in the predetermined sequence;
write address pointer means coupled to the memory means for assigning sequential addresses for storing the image data elements in the predetermined sequence with the addresses being repeated after a number of data elements equal to the predetermined number of data elements has been stored; and
read address pointer means also coupled to the memory means for reading data out of memory in a sequence other than the predetermined sequence and corresponding to the pixel locations associated with the pixel-printing elements for each head position.

34. An apparatus according to claim 33 wherein the predetermined number of data elements of the memory means is of sufficient size for reading the stored data elements out of the memory means before being replaced with data elements written to the same addresses.

35. An apparatus according to claim 33 wherein the write address pointer means comprises counter means incremented each time a data element is written into the memory means and which resets to a first memory address of the memory means when incremented after a data element is written to a last memory address corresponding to the storing of the predetermined number of data elements.

36. An apparatus according to claim 33 wherein the read address pointer means generates a maximum read address equal to the last memory address in which a data element is stored.

37. An apparatus according to claim 36 wherein the read address pointer means generates a read address between the first and last memory addresses when a read address would otherwise exceed the maximum read address.

* * * * *